(No Model.)
G. S. ANDRES.
APPARATUS FOR MAKING EXTRACTS.
No. 436,623. Patented Sept. 16, 1890.
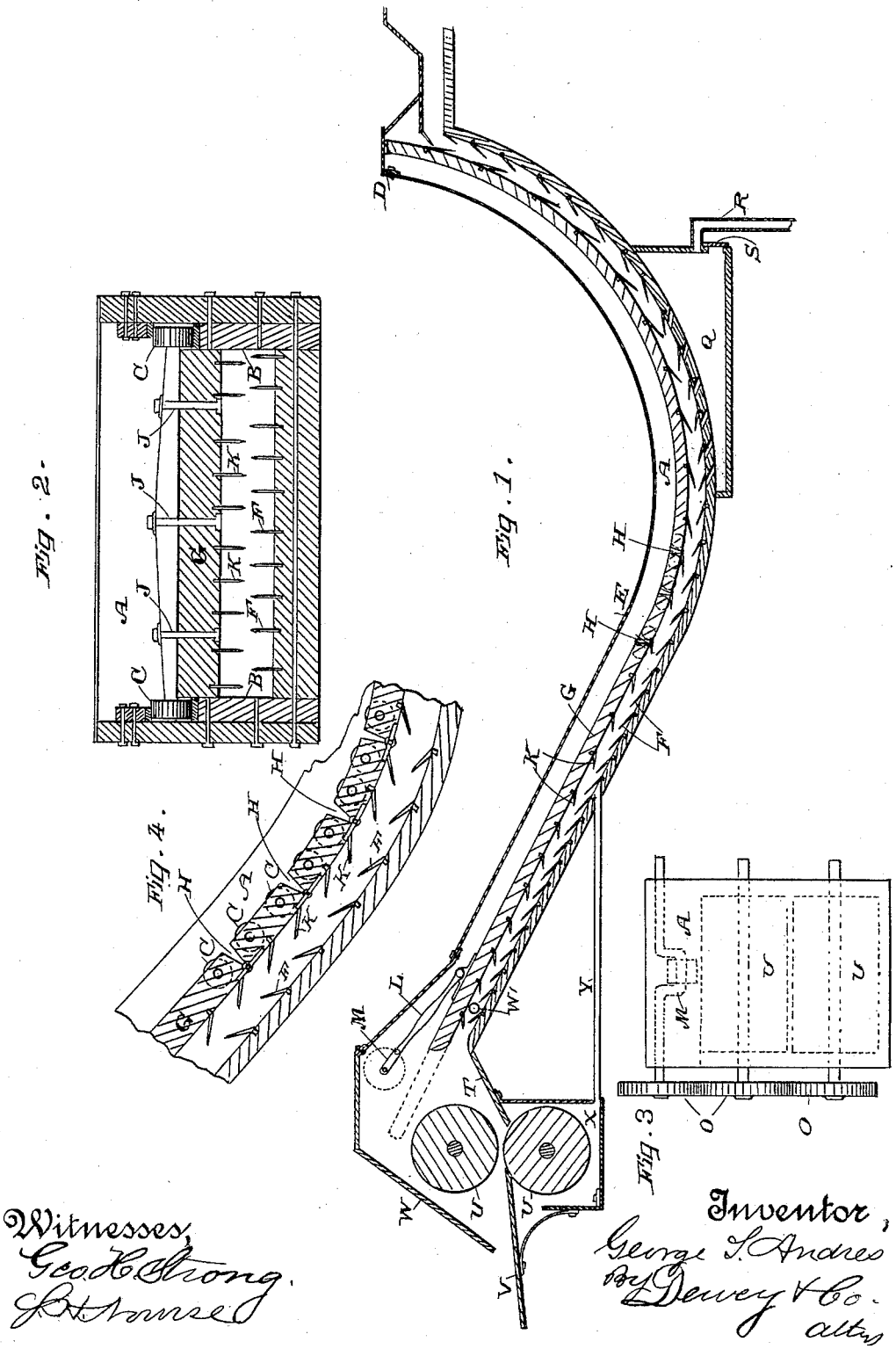
Witnesses
Geo. H. Strong.
Inventor,
George S. Andres
By Dewey & Co.
atty

UNITED STATES PATENT OFFICE.

GEORGE S. ANDRES, OF SAN FRANCISCO, CALIFORNIA.

APPARATUS FOR MAKING EXTRACTS.

SPECIFICATION forming part of Letters Patent No. 436,623, dated September 16, 1890.

Application filed April 15, 1890. Serial No. 348,048. (No model.)

*To all whom it may concern:*

Be it known that I, GEORGE S. ANDRES, a citizen of the United States, residing in the city and county of San Francisco, State of California, have invented an Improvement in Apparatus for Making Extracts; and I hereby declare the following to be a full, clear, and exact description of the same.

My invention relates to an apparatus for extracting from animal and vegetable fibers the fatty acids, oils, and other soluble matter which may be contained in said fiber, all of which constituents are soluble in water or more volatile solvents, such as some of the hydrocarbons, bisulphide of carbon, alcohol, ether, &c.

The object of this invention is to provide an apparatus of simple construction, by means of which extracts may be obtained from animal or vegetable fiber, either in continuous or intermittent manner, and which may also be employed for more perfectly removing dirt and other soluble matter from the fiber.

Referring to the accompanying drawings for a more complete explanation of my invention, Figure 1 is a vertical sectional elevation taken through the apparatus. Fig. 2 is a transverse section. Fig. 3 is a rear end view showing the driving-gears and crank. Fig. 4 is an enlarged section of the tank and movable cap.

A is a tank having the sides B fixed thereto and properly stayed and secured by bolts, forming also a support and guide for the rollers C. This tank has one end made in the form of a segment of a circle which extends from the point D, where the fiber is delivered into it, to a point E, where it meets the straight portion of the tank. This straight portion forms a tangent with the circle and stands at an angle of about thirty degrees, this angle being (more or less,) according to the length of the straight portion of the tank.

The bottom of the tank has fixed in it, at proper distances apart, the pointed wires or teeth F, which project upward and toward the outlet or discharge end. Within this tank is fitted a movable cap G. That portion which fits the circular portion of the tank is made of a similar shape, having the same center of form, and the part which fits the straight and inclined portion of the tank is made straight. Between these two sections are formed hinged joints, as shown at H, so that this cap may be moved or reciprocated, and will follow the outline of the bottom of the tank. This movable portion is mounted upon rollers or wheels C, which travel in guides in the sides of the tank, these guides having the same curvature as that of the tank, so that the rollers will travel in them and retain the moving cap always at a certain equal distance from the bottom of the tank. This cap is suspended from the axles of the rollers, as shown in section, Fig. 2, by bolts J. In the lower face of this cap, which is adjacent to the bottom of the tank, are fixed pointed wires or teeth K, which are inclined toward the outlet or discharge end of the tank. The upper end of the straight portion of this cap is connected by a pitman L with the crank M, power being transmitted to the crank-shaft by means of gear-wheels O or other suitable device intermediate between the crank-shaft and the source of power.

The bottom of the tank has slots or openings at the lowest point of the curve, through which any liquid is allowed to pass into a settling-chamber Q, so that all liquids and sediment which are extracted from the fiber will flow into this tank and the sediment will settle to the bottom of the chamber.

A discharge-pipe R opens out from the chamber Q a short distance above the bottom, and serves to deliver the liquid portion of the discharge into any suitable receptacle.

A discharge-opening is made in the bottom of the chamber Q, fitted with a hand-hole plate S, which may be removed at any time to discharge the accumulation of sediment from the chamber.

At the discharge end of the tank A is an incline T, over which the fiber passes when it has reached this end, and U U are adjustable rollers between which the fiber is passed and pressed, so as to extract any moisture remaining in it before it is delivered upon the platform V, and thence conveyed away.

W is an inclined housing or cover extending down over the compression-rollers nearly to the platform or table V. This housing prevents the escape of volatile vapors at this point.

The operation of the apparatus will then be as follows: The crank-shaft being set in motion, the toothed cap will be caused to reciprocate, the straight portion moving parallel with the bottom above which it is supported by the rollers and the curved portion will follow the curve of the bottom of the tank, being allowed to do this by reason of the jointed sections H, previously described, which unite it with the straight portion. The fiber is fed in at the upper end of the curve D, and being caught by the teeth of the cap will be drawn down the full length of the stroke of the movable cap or top. When the cap returns, the teeth in the lower part or bottom of the tank will hold the fiber at the point to which it has been advanced by the teeth of the cap, and the next reciprocation will again move it on, thus moving it all the way through the passage between the cap and the bottom of the tank until it reaches the discharge end, where it passes out and between the pressing-rollers. Near the upper end of the straight portion of the tank a pipe W' opens into it, and the liquid solvent is allowed to flow down, thus dissolving out any valuable portions in the fiber which it may be desired to save, and also serving to wash out dirt and foreign substances which it is desirable to remove from the fiber. The fiber meets the solvent within the tank, and as it is advanced descends into the solvent through the lowest portion and thence up the inclined straight portion, being continuously subjected to a fresh solvent until it is thoroughly washed and freed from the material which it contains. The movement of the teeth in the cap over those in the bottom not only advances the fiber, but subjects it to a rolling and rubbing movement, which materially assists in cleansing it and extracting the soluble material contained in it. The sediment and solution pass out through the slots or openings in the bottom of the tank into the settling-tank, where, as before described, the heavier sediment is deposited, while the liquid is allowed to flow off through the discharge-pipe. The principal portion of the solvent is pressed out from the fiber in passing between the rollers and runs into a drip-tank X, from which it may be again conveyed into the operating-tank either directly by gravitation through a pipe Y or by elevating it above the level of the main inlet-pipe W' and its tank. After the fiber has been discharged from between the rollers it may be subjected to any further treatment to dry it or remove and condense the volatile solvents still remaining in it.

Having thus described my invention, what I claim as new, and desire to secure by Letters Patent, is—

1. An apparatus for extracting soluble matter from animal or vegetable fiber, consisting of a tank having the first portion of its bottom formed in the curve of a circle and the discharge portion in a straight line meeting said circle at a tangent, backwardly-inclined teeth fixed in the bottom of said tank, in combination with a cap having a curved and straight portion corresponding to the curvature of the tank-bottom and jointed sections hinged together at the point where the curve of the circle meets the straight portion, backwardly-inclined teeth fixed in the bottom of said cap, a crank and a means for imparting rotary motion thereto, and a pitman connecting said crank with the cap, whereby the latter is caused to reciprocate above the tank-bottom and parallel therewith, substantially as herein described.

2. The tank having its bottom composed of curved and straight sections and provided with openings or slots through which the solvent may flow, a cap or top formed similarly of curved and straight sections and having the jointed sections connecting the two, guides or rollers upon which said cap is supported and by which it is retained at an equal distance from the bottom of the tank, a feed-opening through which vegetable fiber is delivered into the space between the cap and the bottom of the tank at the upper end of the curved section, backwardly-inclined teeth fixed in the bottom and in the cap, a crank-and-pitman connection with said cap whereby it is caused to reciprocate above the tank-bottom and advance the fiber by means of the teeth in the two parts, an inlet-pipe through which a solvent liquid is admitted so as to flow down the straight portion of the tank in the opposite direction from the movement of the fiber, a receiving and settling tank into which the openings in the bottom of the tank lead, and a discharge-pipe leading from said tank, substantially as herein described.

In witness whereof I have hereunto set my hand.

GEORGE S. ANDRES.

Witnesses:
S. H. NOURSE,
H. C. LEE.